United States Patent [19]

Thomas

[11] Patent Number: 5,773,098
[45] Date of Patent: *Jun. 30, 1998

[54] APPLYING A FLUOROPOLYMER FILM TO A BODY

[75] Inventor: Thomas Ronald Thomas, Dingwall, Scotland

[73] Assignee: British Technology Group, Ltd., London, England

[*] Notice: The term of this patent shall not extend beyond the expiration date of Pat. No. 5,516,561.

[21] Appl. No.: 561,384

[22] Filed: Nov. 21, 1995

Related U.S. Application Data

[63] Continuation-in-part of Ser. No. 167,966, Apr. 26, 1994, Pat. No. 5,516,561.

[30] Foreign Application Priority Data

Jun. 20, 1991 [GB] United Kingdom .................. 9113350

[51] Int. Cl.⁶ ................................. B05D 3/04; C08J 7/18
[52] U.S. Cl. ...................... 427/490; 427/245; 427/255.6; 427/307; 427/534; 427/536; 427/538
[58] Field of Search ................................. 427/490, 245, 427/255.6, 255.1, 534, 535, 536, 538, 307, 296, 322

[56] References Cited

U.S. PATENT DOCUMENTS

| | | | |
|---|---|---|---|
| 3,700,489 | 10/1972 | Borysko | 427/255.6 |
| 4,052,754 | 10/1977 | Homsy | 3/1.9 |
| 4,391,843 | 7/1983 | Kaganowicz et al. | 427/490 |
| 4,479,982 | 10/1984 | Nilsson et al. | 427/490 |
| 4,718,907 | 1/1988 | Karwoski | 427/296 |
| 4,729,906 | 3/1988 | Kleeberg et al. | |
| 4,791,012 | 12/1988 | d'Agostino et al. | 427/490 |
| 4,869,922 | 9/1989 | d'Agostino et al. | 427/490 |
| 4,906,240 | 3/1990 | Reed et al. | 604/307 |
| 5,041,304 | 8/1991 | Kusano et al. | 427/255.6 |
| 5,045,357 | 9/1991 | Montonaga et al. | 427/255 |
| 5,087,776 | 2/1992 | Tonelli et al. | 570/134 |
| 5,091,204 | 2/1992 | Ratner et al. | 427/490 |
| 5,192,580 | 3/1993 | Blanchet-Fincher | 427/596 |
| 5,244,730 | 9/1993 | Nguyen et al. | 427/490 |
| 5,246,451 | 9/1993 | Trescony et al. | 427/490 |
| 5,387,378 | 2/1995 | Pintauro et al. | 264/48 |
| 5,411,769 | 5/1995 | Hornbeck | 427/534 |
| 5,425,865 | 6/1995 | Singleton | 427/430.1 |
| 5,437,900 | 8/1995 | Kuzowski | 427/534 |
| 5,516,561 | 5/1996 | Thomas | 427/490 |

FOREIGN PATENT DOCUMENTS

| | | |
|---|---|---|
| 0 247 771 | 1/1990 | European Pat. Off. . |
| 62-204826 | of 0000 | Japan . |
| 90 13593 | 11/1990 | WIPO . |
| 93/00394 | 1/1993 | WIPO . |

OTHER PUBLICATIONS

Clark, et al: "Plasma Polymerization. III. An ESCA Investigation of Polymers Synthesized by Excitation of Inductively Coupled RF Plasmas in Perfluorocyclohexa–1,3– and 1–4–Dienes, and in Perfluorocyclohexene", Journal of Polymer Science: Polymer Chemistry Edition, vol. 18, 407–425 (1980).

Pachonik: "Erzeugung Dunner Glimmpolymerisierter Schichten", Thin Solid Films, vol. 38, No. 2, 1976, pp. 171–182.

World Patents Index Latest Week 8528, Jun. 3, 1985, Derwent Publications Ltd., AN 169068, & JP, A,60 099 326, Jun. 3, 1985, see abstract.

World Patents Index Latest Week 8626, May 15, 1986, Derwent Publications Ltd., AN 165034, & JP, A,61 097 008, May 15, 1986, See abstract.

*Primary Examiner*—Diana Dudash
*Attorney, Agent, or Firm*—Cushman Darby & Cushman IP Group of Pillsbury Madison & Sutro LLP

[57] ABSTRACT

A thin fluoropolymer film is covalently bonded to a microporous ptfe film to make a bilayer for separation, filtration or reverse osmosis, by exposing the microporous film to perfluorocyclohexane under plasma. The perfluorocyclohexane molecules undergo scission and the fragments combine on the substrate to make a fluoropolymer film wherein the pores of the substrate have not been completely closed by the coating.

15 Claims, No Drawings

APPLYING A FLUOROPOLYMER FILM TO A BODY

This is a continuation-in-part application of U.S. application Ser. No. 08/167,966, filed Apr. 26, 1994, now U.S. Pat. No. 5,516,561.

This invention relates to applying a fluoropolymer film to a body, especially a porous and microporous films of fluoropolymers, and extends to coated bodies and two layer films.

BACKGROUND OF THE INVENTION

Microporous films and membranes from polymers are well known, and asymmetric forms find wide application in filtration and separation. Their manufacture is typically undertaken by a variety of casting processes and other relatively straightforward techniques allowable by the physical and chemical nature of the polymer. Polymers amenable to such straightforward techniques however are thermally, chemically and sometimes physically inferior to the more stable fluoropolymers, e.g. polytetrafluoroethylene (ptfe). Fluoropolymers are selected for their inertness and chemical resistance, and these very properties make it difficult to bond layers of fluoropolymers together. The techniques used for processing ptfe owe more to powder metallurgy than plastics as the material is not a true thermoplastic. The manufacture of such components most usually involves a compression molding stage and a heat treatment of sintering stage.

PCT Publication WO 90/13593 discloses a mechanical bonding method for porous ptfe layers which are impregnated with perfluoro ion exchange polymer, and further refers to numerous earlier patents in the field. Such a mechanical bond may not be adequate for all applications. Japanese Laid-Open (Kokai) 62-204826 discloses coating a porous ptfe membrane in a plasma vessel by introducing gaseous tetrakis(trifluoromethyl)dithioethane, which forms a polymer in the form of a thin film on the membrane. This introduces sulphur into the product as well as —$CF_3$ groups at the surface, which is unnecessarily hydrophobic for some applications.

These publications do not teach any way of making a well bonded bilayer of pure fluoropolymer. Such a bilayer could find application in filtration, separation or reverse osmosis.

It would thus be desirable to solve the problem of formation of a very thin continuous layer of fluoropolymer strongly bonded to the surface of a microporous fluoropolymer substrate.

SUMMARY OF THE INVENTION

According to the present invention, a method of applying a fluoropolymer film to a body comprises exposing the body to fragments exclusively of the formula —$C_nF_{2n}$—, under conditions whereby the fragments combine on the surface of the body to form an adherent fluoropolymer layer.

Also, according to the invention, a method of applying a fluoropolymer film to a body comprises exposing the body to a supply of saturated molecules of the formula $C_nF_{2n}$, causing scission of the molecules, and allowing the fragments to combine on the surface of the body to form an adherent fluoropolymer layer.

Further, in accordance with the invention, exposure of the porous or microporous body to the fragments or saturated molecules is terminated before the pores of the body have been completely closed by the deposited fluoropolymer to produce useful products. Thus, coating of the porous or microporous is intentionally discontinued while the product is still porous.

DETAILED DESCRIPTION OF THE INVENTION

The body may be carbonaceous polymer e.g. a fluoropolymer such as ptfe, optionally itself a film, which may be porous or microporous, in which case the layer will be covalently bonded thereto.

The molecules may be cyclo-perfluoroalkanes e.g. $C_nF_{2n}$ where n=4–8, preferably 6. The reason for preferring perfluorocycloalkane is that it can undergo scission affording only multiple $CF_2$ units, in particular no $CF_3$ fragments at all. This cannot occur with noncyclic saturated fluoroalkanes. This allows the product to be as close to ptfe, i.e. $CF_2$ linkages, as possible, avoiding multiple $CF_3$ fragments, which are more hydrophobic than $CF_2$. Of the perfluorocycloalkanes, the butane tends to instability, the pentane is possible, while the heptane and octane are becoming exotic for no real gain. The hexane is therefore the most preferred, from cost, stability, availability and volatility points of view.

The body may be etched with a noble gas plasma e.g. argon at say 10–30 W, for the purpose of cleaning, before the film is applied. Thereafter, the body may be subjected to a somewhat gentle plasma irradiation, preferably <5 W, e.g. 0.1–50 W, in a chamber which may be evacuated to 0.01 to 5 torr, such as 0.2 to 0.3 torr, of fluorocarbon. Expressed in terms of unit area-to-be-coated of the body, preferred plasma powers are <100 W/m$^2$, e.g. 2–1000 W/m$^2$. Lower powers lessen undesirable crosslinking.

As a new product in its own right, the invention provides a carbonaceous polymer (e.g. ptfe) body covalently bonded to a fluoropolymer film. Likewise as a new product, the invention provides a two layer fluoropolymer film containing no atoms other than of carbon and halogen and which cannot be delaminated by hand.

A specific embodiment of the invention will now be described by way of example, for producing a continuous film of plasma polymer upon a microporous polymeric substrate.

Microporous ptfe film manufactured by the Mupor™ procedure, European Patent 247771, is the substrate to be coated. A 0.06 m$^2$ sample of it is placed in an enclosure which is then evacuated to low pressures, about 0.05 torr, to remove air and moisture. Plasma of power 5 W is then generated in the enclosure via say high voltage, 3000 to 40000 volts or by a high frequency generator, say 10 MHz or 13.56 MHz. Perfluorocyclohexane at 0.2 torr is introduced into the cavity at 0.2 ml/min.

Under these conditions very reactive species are produced which in turn react with the surface of the article, which reactive sites can then in turn react with monomeric species introduced in the enclosure. The experimental conditions required will vary from one system to another and the techniques and durations employed similarly can be varied to suit individual requirements, e.g. 'etching' where surfaces can be cleaned by the gradual erosion of the surface by reactive species, plasma polymerization and plasma initiated 'grafting'. The cyclo-$C_6F_{12}$ is subjected to a sufficiently high electron voltage to generate perfluoro fragments, e.g. $CF_2$, $C_2F_4$, $C_3F_6$ These species then react to form a layer of plasma polymer across, and covalently bonded to, the surface and, in so doing, fill the pore entrances, eventually building into a controlled continuous thin film, the process being terminated when ptfe film having 1-micron pores under these conditions for 10 minutes yielded a coating several microns thick sealing the pores. For typical smaller-pore films, a useful product may be attained in say 2 minutes.

It will be noted that the process occurs in the gas phase under very mild conditions. The plasma generated within the cyclohexane atmosphere creates active fragments (radicals etc) based on $CF_2$ units which polymerize and attach to the surface of the membrane in situ, which itself remains at a temperature of around 300K.

Clearly careful control will ensure the thinnest continuous layer to maximize the aqueous flow rates during e.g. reverse osmosis separations of saline or brackish water.

Such materials have great utility in the field of filtration and separation allowing for the first time a membrane filter with chemical, biological and thermal advantages of ptfe but with advantageous flux rates associated with the very thin active layer.

Other co-called anisotropic ptfe filters have poor bond strength between the substrate and the active layer. This technique not only allows great control over the film properties but ensures the strongest possible adhesion to the substrate.

The process is both rapid and cost effective and additionally has wide applicability in the separative field. For example composite materials can be manufactured with great savings, e.g. in those situations where the active layers are very expensive a lower cost substrate can be used thus minimizing the quantity of the active layer.

A further application embodies dissimilar monomeric species attached to both sides of the substrate, and additionally the technique is equally effective on other geometries, e.g. tubular and granular forms of the substrate ptfe. This now allows separations of materials in areas of chromatography normally restricted to silica-based phases.

A further embodiment of the invention is described by way of example for producing a film of plasma polymer upon a microporous polymeric substrate where exposure of the substrate to fragments or saturated hydrocarbons is terminated before the pores of the-substrate have been completely closed by the deposited fluoropolymer.

This embodiment of the invention finds particular application in a number of woven and non-woven e.g. needle-felted materials especially those for use in the photocopier industry known as photocopier cleaning webs, which typically need to be thermally stable and resistant to e.g. silicone oil. The finished product must hold silicone oil and allow it to diffuse out in a controlled way, e.g. at the rate of just 0.1–0.2 $\mu l$/A4 sheet for the life of the web.

The same principles apply to the waterproof-breathable garment market. In each case pre-existing pores are partly closed by the deposition of ptfe and the process stopped at some desired smaller-than-starting pore size.

In these two instances, as would be usual in this type of industry, the process is continued under a convenient partial pressure using a convenient plasma power for a certain length of time. If the product still has too high a porosity, it is returned for further treatment, more than once if necessary, until its properties (e.g. rate of diffusion of silicone oil through it) match the required properties. Although the pore size is diminishing, it is not normal to go to the significant trouble of measuring the pore size since, especially in irregular non-woven starting materials, we are dealing with a complex pore size distribution, and the customer for the material is usually interested in its properties (e.g. rate of diffusion through it) rather than in the exact percentage by which the pores have been diminished.

A third example is the cold plasma treatment of cellulosic (paper) materials with perfluorocyclohexane to render the porous surface hydrophobic; such paper products are at present siliconized to achieve phase separations of immiscible liquids. Other applications are in low cost paper dust bags and air filters from pleated paper where pore size diminution is of minor significance, but what matter more are the surface properties and behavior, such as dust release, derived from a plasma polymer coating however thin as long as it is complete. Cost is very important and therefore a large scale rapid procedure would be ideal, e.g. 1 meter wide processed at say 5–7 meters per minute.

By way of example, the process according to the invention has been applied to 70% polyester/30% aramid fiber blends (poly(1,3-phenyleneisophthalamide) type) where the non-woven fibre diameter is described as 1.5 denier. The typical pore size of this blend was of the order of 50 microns as determined by microscopy. A 30 mm×600 mm sheet of this blend was purged in a 10 liter R300 machine under perfluorocyclohexane at 0.2 mbar for 5 minutes, then a cold plasma was ignited at 50 watts for 10 minutes. The machine was inductively coupled 13.56 MHz r.f.

By adjusting the power, monomer concentration and duration, the final properties of the product can be controlled, in particular its release property against the photocopier fuser roller (and hence the paper), and the rate of oil leakage. Therefore, progressive closure of pores in substrates is an important feature. The plasma was stopped when the pore size had been reduced (by the deposition of plasma polymer) to the requisite size, which for one trial was 10–20 microns (taking less than 1 hour) and for another 1–10 microns (taking somewhat longer). The necessary partial pressure, duration and power of treatment to achieve this were determined by trial and error as explained above until a product with satisfactory properties was obtained. When it was desired to make more of the same product, with the same degree of pore size diminution, the process was simply repeated using the same conditions, as will be familiar to the skilled reader, who does not expect full working directions in this technology since, with so many variables (e.g. temperature, partial pressure, plasma output, chamber geometry, electrode layout, sample type, shape, size and geometry and sample position and orientation), trial and error is the accepted procedure.

Woven nylon materials have been treated using a similar range of plasma powers. Each end of the bidentate six-carbon ligand from single-location scission of the fluorinated cyclohexane can lock on to fibers in such a way that rotation of the hydrophobic fragments will not occur so readily; such rotation can arise in prior art processes and cumulatively can reduce the consistency of properties of the garment. Paper or nylon porous materials treated in the above machine at 100 W under 0.15 mb perfluorocyclohexane for 2–3 minutes showed, under X-ray photoelectron spectroscopy analysis, that the surface was entirely coated with ptfe, albeit a thin layer, only a few nanometers thick, with no cellulosic or polyamide groups detectable on the surface. This thin layer is thus enough to make the material entirely hydrophobic and to make it behave as if it were porous ptfe. A 5-minute treatment yielded similar results and could be adopted where a more complete elimination by plasma polymer coating of uncovered pinholes revealing the substrate compound was more important than production speed and economy. To close all the pores could take considerably longer if considered necessary.

I claim:

1. A method of applying a fluoropolymer film to a porous or microporous body, comprising exposing the body to a supply of saturated molecules of the formula $C_nF_{2n}$, where n=4–8, causing scission of the molecules, and allowing the fragments to combine on the surface of the body to form an adherent fluoropolymer layer, and ceasing exposure of the body to the supply of saturated molecules before the pores of the body have been completely closed by the deposited fluoropolymer.

2. A method of applying a fluoropolymer film according to claim 1 wherein the porous body is a carbonaceous polymer, and the fragments combine on the surface of the body to form a fluoropolymer layer covalently bonded to the body.

3. A method according to claim 1, wherein the carbonaceous polymer is a fluoropolymer.

4. A method according to claim 1, wherein the body is itself a film.

5. A method according to claim 4, wherein the body is a microporous film.

6. A method according to claim 1, wherein the molecules are of cycloperfluoroalkane.

7. A method according to claim 6, wherein the molecules are of cyclo-$C_nF_{2n}$ where n=4, 5, 7 or 8.

8. A method according to claim 6, wherein the molecules are of cycloperfluorohexane.

9. A method according to claim 1, wherein the porous body is etched before the application of said film thereto.

10. A method according to claim 1, wherein the body is subjected to plasma irradiation during its exposure.

11. A method according to claim 10, wherein the plasma power is less than 100 W.

12. A method according to claim 11, wherein the plasma power is from 0.1 to 50 W.

13. A method according to claim 11 or 12, wherein the plasma power is less than 5 W.

14. A method according to claim 1, performed in a chamber evacuated to 0.01 to 5 torr.

15. A method according to claim 9, wherein the etching is performed by a noble gas plasma.

* * * * *

UNITED STATES PATENT AND TRADEMARK OFFICE
CERTIFICATE OF CORRECTION

PATENT NO. : 5,773,098
DATED : June 30, 1998
INVENTOR(S) : THOMAS, Thomas R.

It is certified that error appears in the above-identified patent and that said Letters Patent is hereby corrected as shown below:

ON THE COVER PAGE:

Please add:  --[22]  PCT Filed:       Jun. 19, 1992
              [86]  PCT No.:         PCT/GB92/01111
                    § 371 Date:     Apr. 26, 1994
                    § 102(e) Date: Apr. 26, 1994
              [87]  PCT Pub. No.:   WO93/00394
                    PCT Pub. Date: Jul. 1, 1993--

Signed and Sealed this

Sixteenth Day of January, 2001

Attest:

Attesting Officer

Q. TODD DICKINSON
Commissioner of Patents and Trademarks